(12) United States Patent
Chen et al.

(10) Patent No.: US 7,616,885 B2
(45) Date of Patent: Nov. 10, 2009

(54) SINGLE LENS AUTO FOCUS SYSTEM FOR STEREO IMAGE GENERATION AND METHOD THEREOF

(75) Inventors: Liang-Gee Chen, Taipei (TW); Wan-Yu Chen, Taipei (TW); Yu-Ling Chang, Taipei (TW)

(73) Assignee: National Taiwan University, Taipei (TW)

( * ) Notice: Subject to any disclaimer, the term of this patent is extended or adjusted under 35 U.S.C. 154(b) by 462 days.

(21) Appl. No.: 11/541,694

(22) Filed: Oct. 3, 2006

(65) Prior Publication Data
US 2008/0080852 A1 Apr. 3, 2008

(51) Int. Cl.
*G03B 35/00* (2006.01)
(52) U.S. Cl. .................. 396/324; 348/42; 348/50; 359/30; 359/462; 352/57; 352/60
(58) Field of Classification Search .......... 396/324, 396/325, 216; 348/345, 42, 47–50; 359/30, 359/31, 458, 462, 478; 352/57, 58, 60, 62
See application file for complete search history.

(56) References Cited
U.S. PATENT DOCUMENTS
6,229,913 B1 * 5/2001 Nayar et al. ............. 382/154

| | | | |
|---|---|---|---|
| 2001/0019450 A1* | 9/2001 | Ogino | 359/462 |
| 2003/0214502 A1* | 11/2003 | Park et al. | 345/420 |
| 2004/0135780 A1* | 7/2004 | Nims | 345/419 |
| 2007/0024614 A1* | 2/2007 | Tam et al. | 345/419 |
| 2007/0159602 A1* | 7/2007 | Fergason | 353/8 |
| 2007/0247522 A1* | 10/2007 | Holliman | 348/46 |
| 2007/0296721 A1* | 12/2007 | Chang et al. | 345/427 |

* cited by examiner

*Primary Examiner*—Rochelle-Ann J Blackman
*Assistant Examiner*—Warren K Fenwick
(74) *Attorney, Agent, or Firm*—Bacon & Thomas, PLLC

(57) ABSTRACT

The invention presents a single lens auto focus system of stereo image generation and a method thereof. The stereo three-dimensional (3D) image capturing method of a single lens auto focus camera, includes the steps of a) taking plural multi-focus images; b) estimating the plural multi-focus images to obtain a depth map and an all-in-focus image; c) mixing the depth map with plural background depth maps to obtain a mixed depth map; d) obtaining respectively a left image for left eye of user and a right image for right eye of user by means of depth image based rendering (DIBR); and e) outputting the left image and the right image, thereby displaying a stereo image onto a 3D display.

22 Claims, 7 Drawing Sheets

SINGLE LENS AUTO FOCUS SYSTEM FOR STEREO IMAGE GENERATION AND METHOD THEREOF

FIELD OF THE INVENTION

The present invention relates to an image capturing system, and more particularly, to a single lens auto focus system of stereo image generation and a method thereof.

BACKGROUND OF THE INVENTION

The television has been developed from the beginning of 20th century. The black and white one, the color one, and even the digital television were disclosed for continuous progress. Human being keeps developing the better vision, and improving the science and technology. In 21st century, people still strive for developing new displaying technique. The new generation display could provide more colorful and finer vision.

According to the prior art, the display, such as CRT TV, PC monitor, LCD TV, and PDP TV, is based on 2-D displaying technique. However, the human vision is based on stereoscopy. For achieving the purpose of stereoscopy, it is important to introduce the stereo vision and the motion parallax. In other words, the stereo three-dimensional (3D) video comprises flat image and depth dimension. There are two images displayed respectively for each one of two eyes. Then, the brain receives two different images from each one of two eyes, thereby obtaining the stereo 3D video.

Please refer to FIG. 1. It illustrates a configuration view showing a stereo image photographing system according to the prior art. As shown in the FIG. 1, the stereo image photographing system includes a photographing unit 10; an image data storing unit 30; a signal processing unit 200; a measuring unit 100; a condition setting unit 70; a photographing position calculating unit 40; a photographing control unit 50; a movement control unit 80; and a driving unit 90.

The photographing unit 10 includes a camera for photographing an image and an omni-directional prism. The image data storing unit 30 stores the data of an image photographed by the camera of the photographing unit 10 and the data of a position measured by the measuring unit 100 in correlation with each other. The signal processing unit 200 performs three-dimensional measurement and analysis based on the data of stereo-photographed image and the position data. For the measuring unit 100, a total station or the like as a survey instrument is used. The measuring unit 100 measures the position data thereof by collimating a prism on the photographing unit 10. Here, automatic measurement is executed by utilizing auto-tracking total station. The condition setting unit 70 sets photographing conditions including a photographing range, accuracy, a camera standardized value and the like. The photographing position calculating unit 40 calculates a proper photographing position based on the photographing range, the necessary accuracy and the photographing conditions of the camera/lens set by the condition setting unit 70. In addition, based on the result of preliminary measurement made by the measuring unit 100, the photographing position calculating unit 40 calculates and decides a photographing scheduled position. The photographing control unit 50 allows the movement control unit 80 and the driving unit 90 to move the photographing unit 10 in order to bring the position data indicating the position of the photographing unit 10 measured by the measuring unit 100 into coincidence or rough coincidence with the photographing position data calculated by the photographing position calculating unit 40.

Then, when coincidence or rough coincidence is set between the measured position data and the calculated photographing position data, the photographing control unit 50 outputs a timing signal for photographing to the photographing unit 10 and the measuring unit 100. In addition, the photographing control unit 50 sends the position data at the photographing timing to the image data storing unit 30. At this time, the photographed image data sent from the photographing unit 10 is stored in the image data storing unit 30. The movement control unit 80 supplies the moving amount of the photographing unit 10 to the driving unit 90. The driving unit 90 enables the photographing unit 10 to move.

The measuring unit 100 is installed in a position with respect to the object to be measured, where the measuring unit 100 does not interfere with the measurement and the photographing position of the photographing unit 10 can be viewed from the measuring unit 100. If the measuring unit 100 is placed roughly in a photographing start position, the operation will be more efficient. Then, the measuring range of the object to be measured is measured by the measuring unit 100. Further, the position of the omni-directional prism 2 of the photographing unit 10 is measured by the measuring unit 100. Then, the measuring unit 100 transfers the measured data to the photographing control unit 50. The condition setting unit 70 sets photographing condition data regarding the object to be photographed in the photographing position calculating unit 40. The data to be set here includes a lens angle of view, a focal distance, a pixel pitch of the digital camera, planar direction necessary accuracy, depth direction necessary accuracy and so on. The photographing position calculating position unit 40 calculates photographing position data based on such conditions for obtaining depth information of the stereo 3D video. Actually, the depth information of the stereo 3D video could be obtained by several methods. It could be obtained by means of a segmentation-based algorithm to perform the 2D-to-3D conversion, or obtained by means of the laser or infrared rays to detect the objects. However, in practice, the prior art is difficult to implement. When the segmentation-based algorithm is introduced, the result is related on the resolution of the algorithm in response to the color blocks or the moving information of objects. Meanwhile, more and more backgrounds should be added into for obtaining the better result. It should cost a lot of money and spend a lot of time to develop the algorithm. On the other hand, when the laser or infrared rays are introduced, a lot of errors could be caused due to the intensity variation thereof. If the intensity is too weak, the taken images should include a lot of noises, and it is difficult to obtain the depth information with consistence. Therefore, a lot of points are produced in the stereo image generation and hinder the vision of user.

Hence, it needs to provide a system and method for obtaining the stereo 3D video through a single lens camera and a stereo image synthesis, which introduces depth estimation from multi-focus images and depth image based rendering (DIBR) for obtaining the stereo 3D video, simplifies the entire structure and process, is capable of achieving the purpose of automatically obtaining the stereo 3D video and without change of the camera itself, thereby facilitating user to take stereo image, and can rectify those drawbacks of the prior art and solve the above problems.

SUMMARY OF THE INVENTION

This paragraph extracts and compiles some features of the present invention; other features will be disclosed in the follow-up paragraph. It is intended to cover various modifications and similar arrangements included within the spirit and scope of the appended claims, and this paragraph also is considered to refer.

Accordingly, the prior art is limited by the above problems. It is an object of the present invention to provide a single lens auto focus system of stereo image generation for obtaining the stereo 3D video through a single lens camera and a stereo image synthesis, which introduces depth estimation from multi-focus images and depth image based rendering (DIBR) for obtaining the stereo 3D video, simplifies the entire structure and process, is capable of achieving the purpose of automatically obtaining the stereo 3D video and without change of the camera itself, thereby facilitating user to take stereo image, and can rectify those drawbacks of the prior art and solve the above problems.

In accordance with an aspect of the present invention, the single lens auto focus system for capturing a stereo 3D image, includes a capturing device with an auto focus module for taking plural multi-focus 2D images; a computation device connected with the capturing device for producing an all-in-focus image in response to the plural multi-focus images and obtaining a depth map of the stereo 3D image; and a 3D display device with depth image based rendering (DIBR) module connected with the computation device to receive the all-in-focus image and the depth map and then produce a left image for left eye of user and a right image for right eye of user, thereby displaying the stereo 3D image.

Preferably, each pixel of the plural multi-focus images has a depth value of a step function obtained by means of a focus measure and depth estimation via the computation device.

Preferably, the computation device obtains a focus measure via equation:

$$ML(x, y) = |2I(x, y) - I(x - \text{step}, y) - I(x + \text{step}, y)| +$$
$$|2I(x, y) - I(x, y - \text{step}) - I(x, y + \text{step})|$$

$$F(i, j) = \sum_{x=i-N}^{i+N} \sum_{y=i-N}^{i+N} ML(x, y) \text{ for } ML(x, y) \geq T_1$$

ML is a modified-Laplacian function, F is summation of ML, and I is a gray-level intensity of the pixel.

Preferably, the computation device obtains depth estimation is executed via equation:

$$\bar{d} = \frac{(\ln F_m - \ln F_{m+1})(d_m^2 - d_{m-1}^2) - (\ln F_m - \ln F_{m-1})(d_m^2 - d_{m+1}^2)}{2\Delta d\{(\ln F_m - \ln F_{m-1}) + (\ln F_m - \ln F_{m+1})\}}$$

Preferably, the computation device further includes a depth interpolation module for correcting the depth value; an erosion estimation module connected with the depth interpolation module for dealing with the depth value to define an edge of object in the stereo 3D image; a depth re-interpolation module connected with the erosion estimation module for correcting the depth value after erosion estimation; and a clean background module connected with the depth re-interpolation module for determining if the depth value is an inner point of the object and clean background free of the object.

Preferably, the 3D display device further includes a vertical edge rectification module for preventing twisted and forked lines of combining the left image and the right image; an edge dependent Gaussian filtering module connected with the vertical edge rectification module for preventing hole formation in an edge of object; a 3D image warping module connected with the edge dependent Gaussian filtering module for transforming the left image and the right image to fill a buffer frame; and an edge dependent hole filling module connected with the 3D image warping module for filling holes of the buffer frame free of filling the left image and the right image.

Certainly, the depth image based rendering (DIBR) module can be a field-programmable gate array (FPGA) and a processor.

Certainly, the depth image based rendering (DIBR) module can be an application-specific integrated circuit (ASIC) accelerator and a processor.

It is another object of the present invention to provide a stereo 3D image capturing method through a single lens camera and a stereo image synthesis, which introduces depth estimation from multi-focus images and depth image based rendering (DIBR) for obtaining the stereo 3D video, simplifies the entire structure and process, is capable of achieving the purpose of automatically obtaining the stereo 3D video and without change of the camera itself, thereby facilitating user to take stereo image, and can rectify those drawbacks of the prior art and solve the above problems.

In accordance with an aspect of the present invention, the stereo 3D image capturing method of a single lens auto focus camera, includes the steps of a) taking plural multi-focus images; b) estimating the plural multi-focus images to obtain a depth map and an all-in-focus image; c) mixing the depth map with plural background depth maps to obtain a mixed depth map; d) obtaining respectively a left image for left eye of user and a right image for right eye of user by means of depth image based rendering (DIBR); and e) outputting the left image and the right image onto a 3D display.

Preferably, the plural multi-focus images are taken at several different focal lengths in a specific period.

Preferably, each pixel of the plural multi-focus images has a depth value obtained by means of a focus measure and depth estimation.

Preferably, the focus measure is executed via equation:

$$ML(x, y) = |2I(x, y) - I(x - \text{step}, y) - I(x + \text{step}, y)| +$$
$$|2I(x, y) - I(x, y - \text{step}) - I(x, y + \text{step})|$$

$$F(i, j) = \sum_{x=i-N}^{i+N} \sum_{y=i-N}^{i+N} ML(x, y) \text{ for } ML(x, y) \geq T_1$$

ML is a modified-Laplacian function, F is summation of ML, and I is a gray-level intensity of the pixel.

Preferably, the depth estimation is executed via equation:

$$\bar{d} = \frac{(\ln F_m - \ln F_{m+1})(d_m^2 - d_{m-1}^2) - (\ln F_m - \ln F_{m-1})(d_m^2 - d_{m+1}^2)}{2\Delta d\{(\ln F_m - \ln F_{m-1}) + (\ln F_m - \ln F_{m+1})\}}$$

Certainly, the depth value can be a step function.

Preferably, the step b) further includes a step b1) of correcting the depth value by means of depth interpolation.

Preferably, the step b) further includes a step b2) of dealing with the depth value by means of erosion estimation for defining an edge of object in the stereo 3D image.

Preferably, the step b) further includes a step b3) of correcting the depth value by means of depth re-interpolation.

Preferably, the step b) further includes a step b4) of determining if the depth value is an inner point of the object and clean background free of the object.

Preferably, the step e) further includes the steps of e1) vertical edge rectification to prevent twisted and forked lines of combining the left image and the right image; e2) edge dependent Gaussian filtering to prevent hole formation in an edge of object; e3) 3D image warping to transform the left image and the right image to fill a buffer frame; and e4) edge dependent hole filling to fill holes of the buffer frame free of filling the left image and the right image.

Preferably, the step d) and the step e) are executed via a field-programmable gate array (FPGA) and a processor.

Preferably, the step d) and the step e) are executed via an application-specific integrated circuit (ASIC) accelerator and a processor.

Certainly, the 3D display can be selected from a group consisting of Anaglyph Glasses, LCD-Shutter Glasses, LCD with Micro-retarder, two-view auto-stereoscopic 3D-LCD, 9-views 3D-LCD, and Polarized DLP Projector.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention discloses a single lens auto focus system of stereo image generation and a method thereof, and the objects and advantages of the present invention will become more readily apparent to those ordinarily skilled in the art after reviewing the following detailed description. The present invention needs not be limited to the following embodiment.

Figure 1:
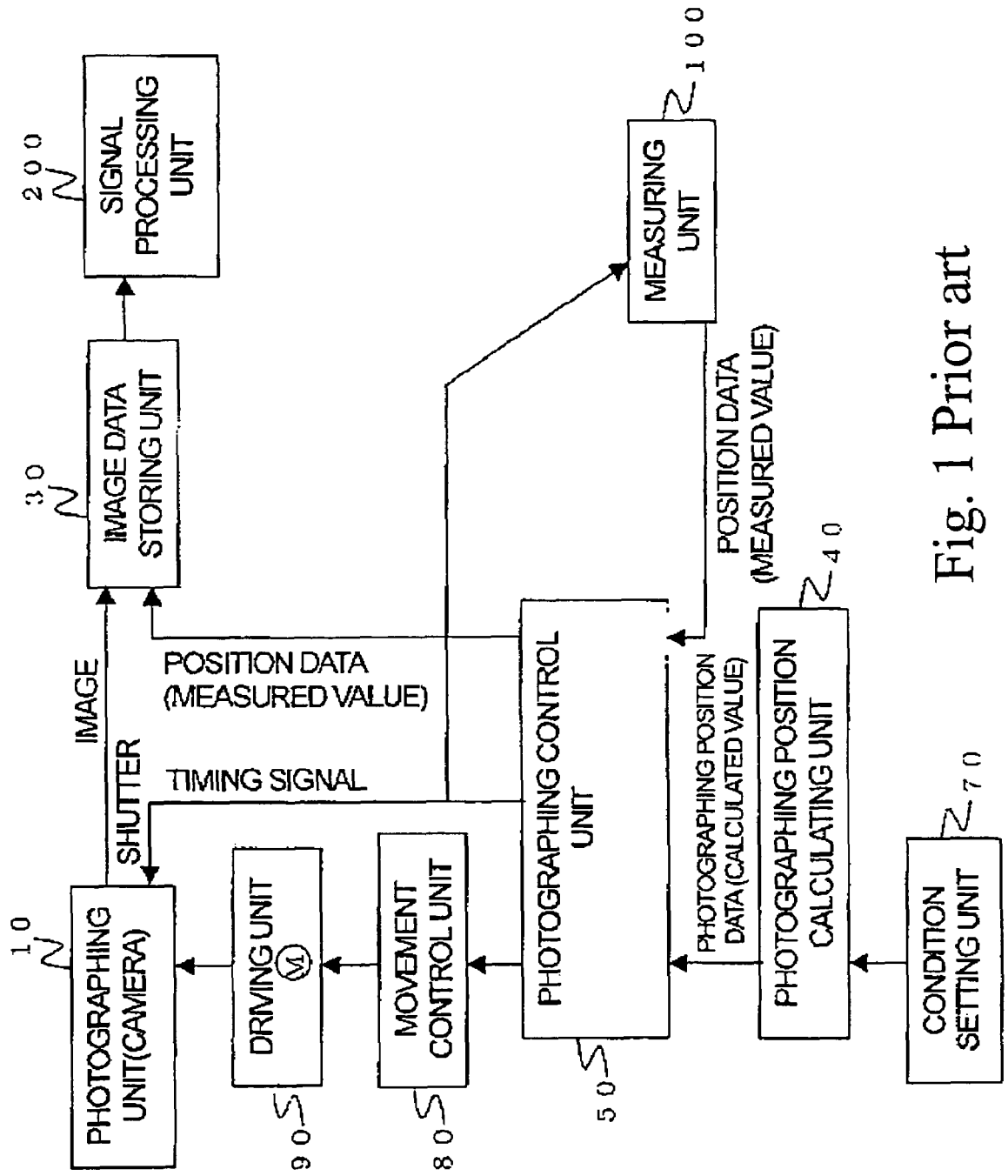
FIG. 1 illustrates a configuration view showing a stereo image photographing system according to the prior art.
Figure 2:
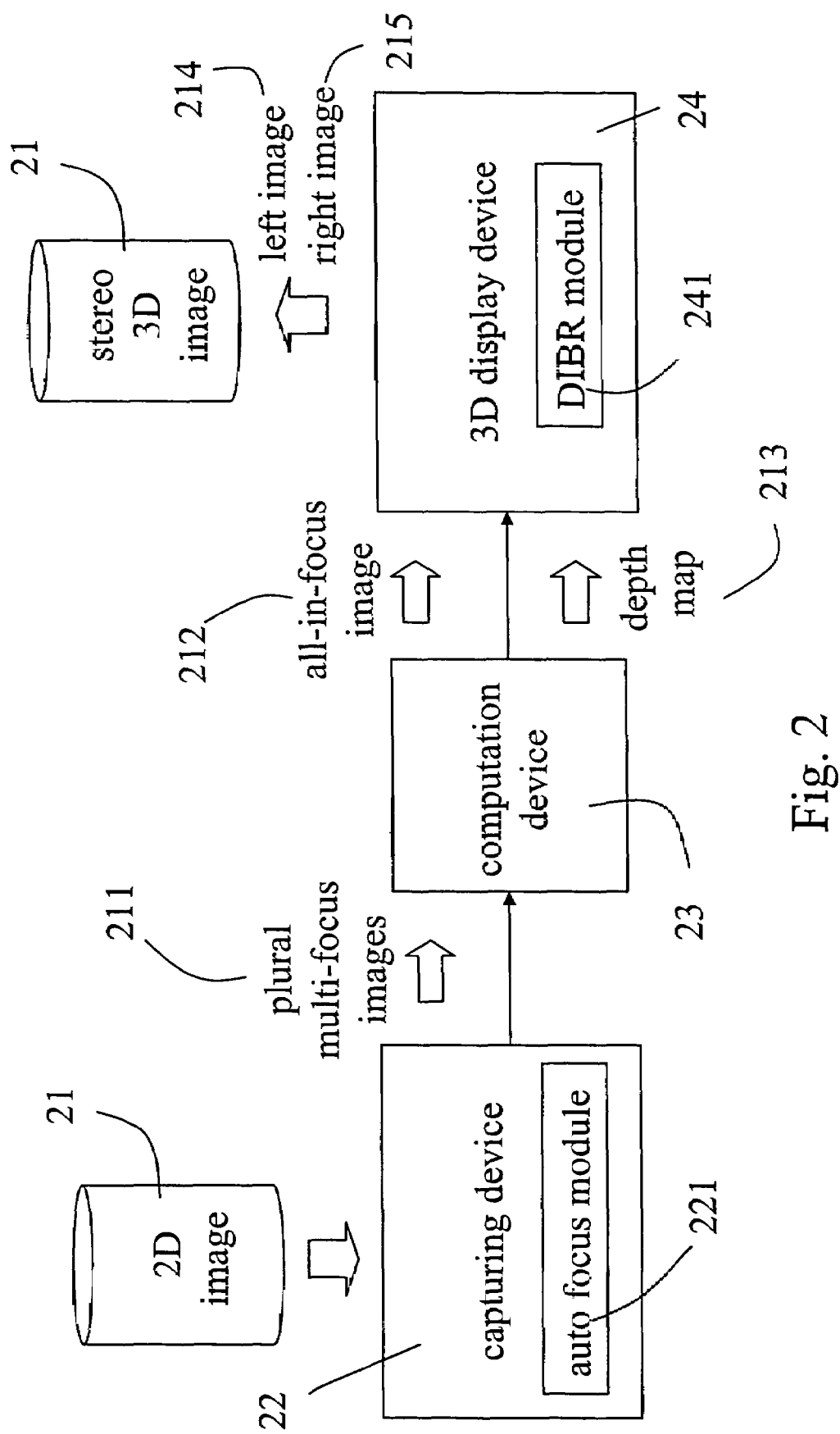
FIG. 2 illustrates a single lens auto focus system for capturing a stereo 3D image according to the present invention.

Please refer to FIG. 2. It illustrates a single lens auto focus system for capturing a 2D image 21. The system includes a capturing device 22 with an auto focus module 221 for taking plural multi-focus 2D images 211; a computation device 23 connected with the capturing device 33 for producing an all-in-focus image 212 in response to the plural multi-focus images 211 and obtaining a depth map 213 of the stereo 3D image; and a 3D display 24 device with depth image based rendering (DIBR) module 241 connected with the computation device 23 to receive the all-in-focus image 212 and the depth map 213 and then produce a left image 214 for left eye of user and a right image 215 for right eye of user, thereby displaying the stereo 3D image.

In practice, each pixel of the plural multi-focus images 211 has a depth value of a step function obtained by means of a focus measure and depth estimation via the computation device 23. The computation device 23 obtains a focus measure via equation:

$$ML(x, y) = |2I(x, y) - I(x - \text{step}, y) - I(x + \text{step}, y)| +$$
$$|2I(x, y) - I(x, y - \text{step}) - I(x, y + \text{step})|$$

$$F(i, j) = \sum_{x=i-N}^{i+N} \sum_{y=i-N}^{i+N} ML(x, y) \text{ for } ML(x, y) \geq T_1$$

ML is a modified-Laplacian function, F is summation of ML, and I is a gray-level intensity of the pixel. Furthermore, the computation device 23 obtains depth estimation is executed via equation:

$$\bar{d} = \frac{(\ln F_m - \ln F_{m+1})(d_m^2 - d_{m-1}^2) - (\ln F_m - \ln F_{m-1})(d_m^2 - d_{m+1}^2)}{2\Delta d\{(\ln F_m - \ln F_{m-1}) + (\ln F_m - \ln F_{m+1})\}}$$

Figure 3:
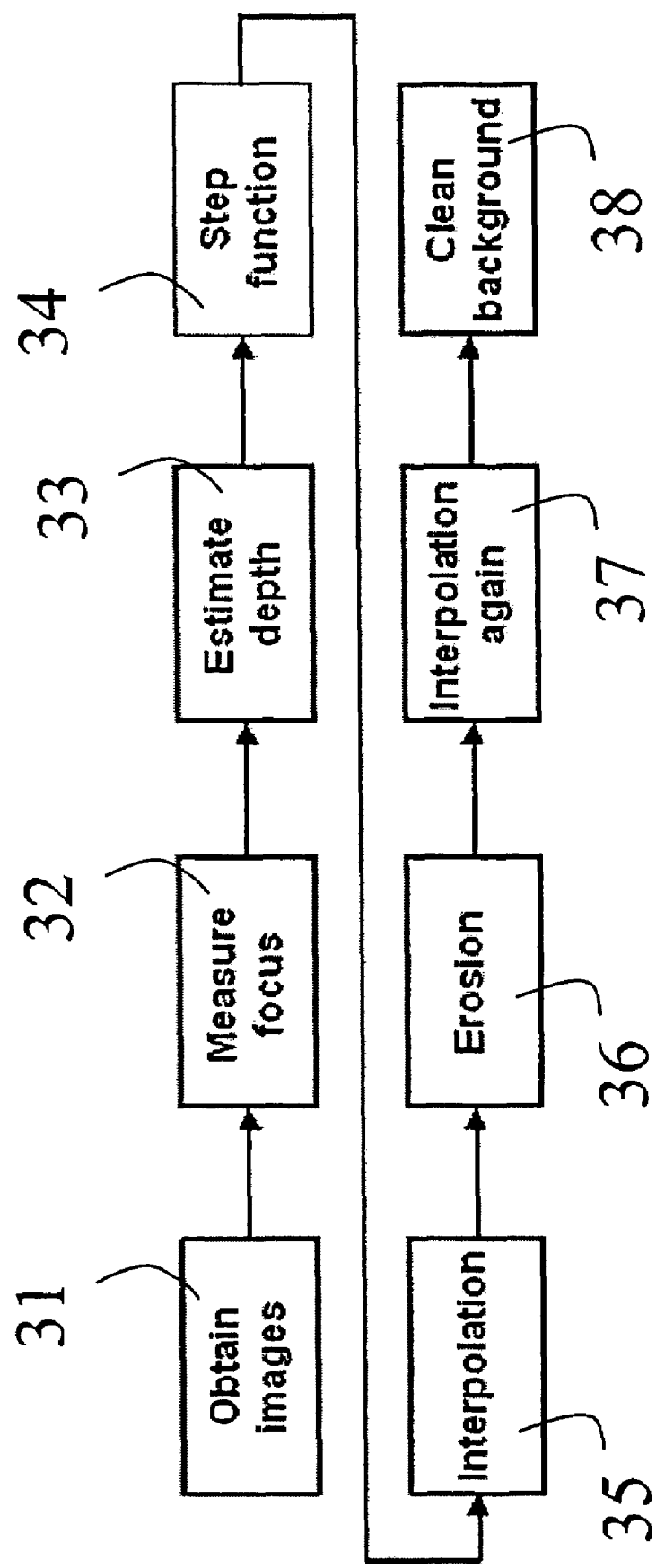
FIG. 3 illustrates a block diagram of the proposed object based depth from focus algorithm according to the present invention.

Please refer to FIG. 3. It further illustrates a block diagram of the proposed object based depth from focus algorithm according to the present invention. After obtaining image, as shown in block 31, each pixel of the plural multi-focus images 211 has a depth value of a step function obtained by means of a focus measure and depth estimation as shown in blocks 32, 33, and 34 of FIG. 3. Furthermore, the computation device 23 further includes a depth interpolation module for correcting the depth value, as shown in block 35; an erosion estimation module connected with the depth interpolation module for dealing with the depth value to define an edge of object in the stereo 3D image, as shown in block 36; a depth re-interpolation module connected with the erosion estimation module for correcting the depth value after erosion estimation, as shown in block 37; and a clean background module connected with the depth re-interpolation module for determining if the depth value is an inner point of the object and clean background free of the object, as shown in block 38.

Figure 4:
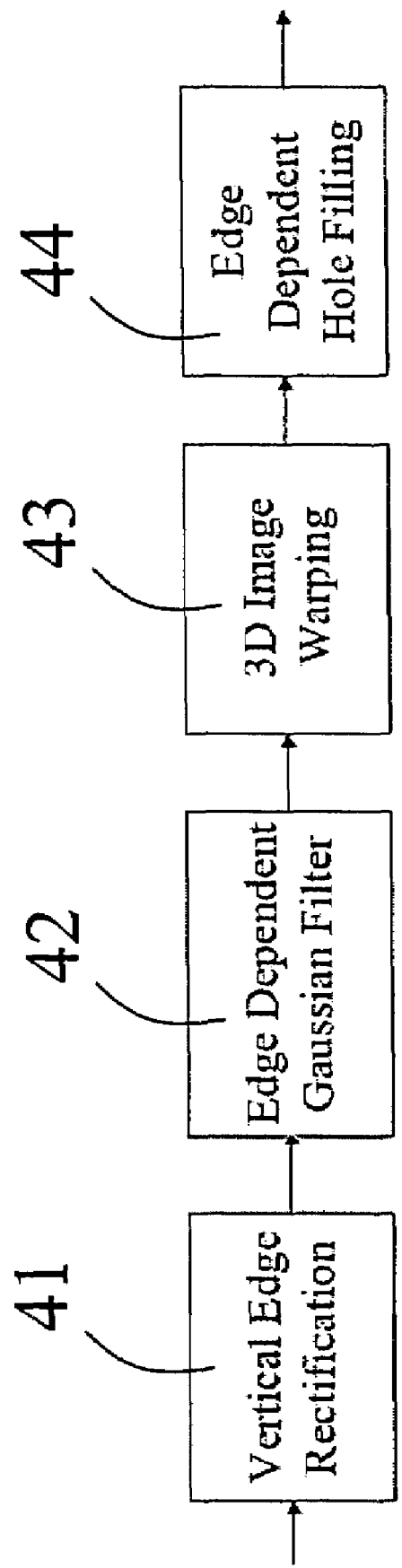
FIG. 4 illustrates a block diagram of the depth image based rendering (DIBR) module according to the present invention.
Figure 5:
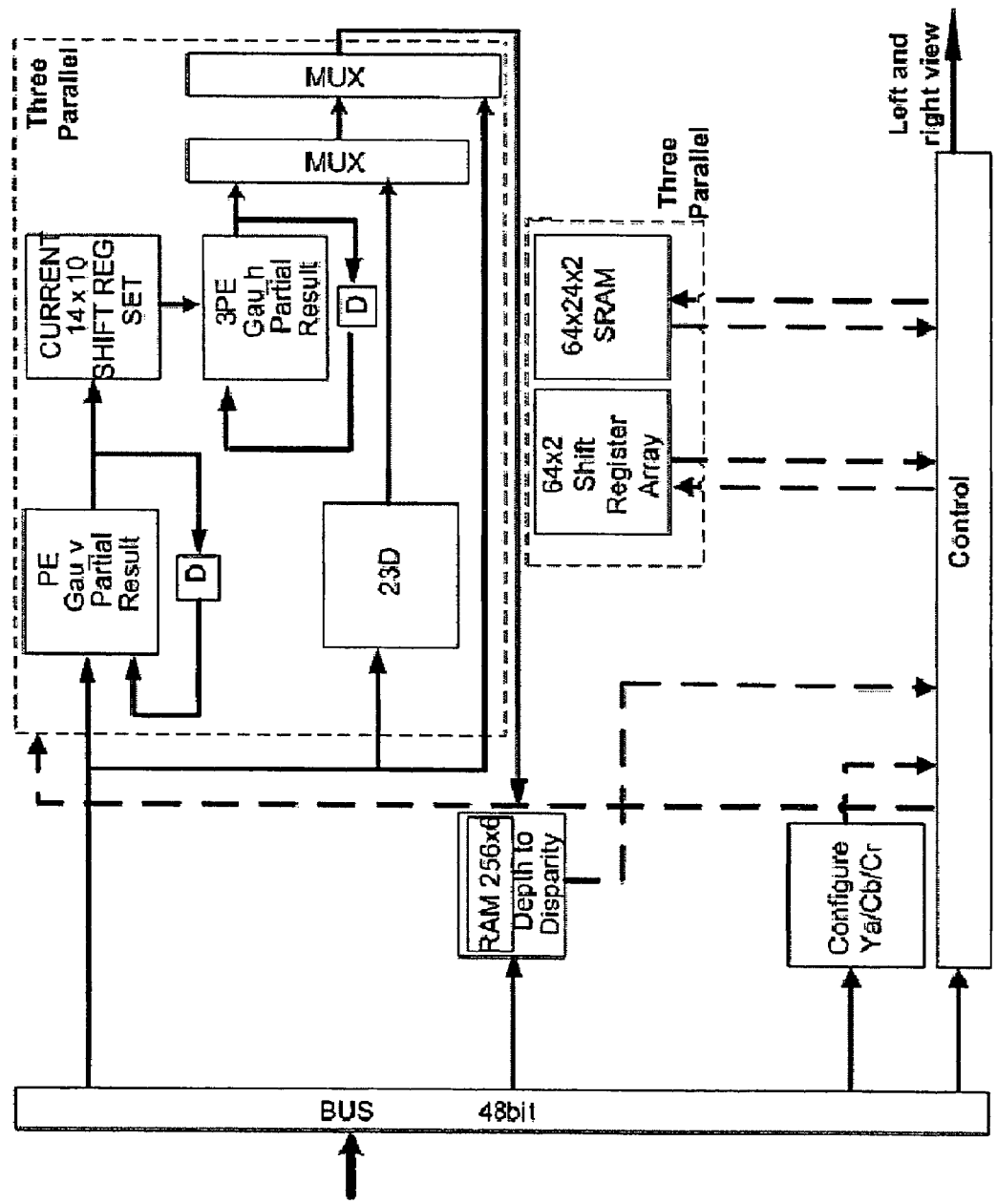
FIG. 5 further illustrates detail structure of depth image based rendering (DIBR) according to the present invention.

In the present invention, the depth image based rendering (DIBR) module 241 can be a field-programmable gate array (FPGA) and a processor. Furthermore, the depth image based rendering (DIBR) module 241 can also be an application-specific integrated circuit (ASIC) accelerator and a processor. Please refer to FIG. 4. It illustrates a block diagram of the depth image based rendering (DIBR) module according to the present invention. Accordingly, the 3D display device 24 further includes a vertical edge rectification module 41 for preventing twisted and forked lines of combining the left image and the right image; an edge dependent Gaussian filtering module 42 connected with the vertical edge rectification module 41 for preventing hole formation in an edge of object; a 3D image warping module 43 connected with the edge dependent Gaussian filtering module 42 for transforming the left image and the right image to fill a buffer frame; and an edge dependent hole filling module 44 connected with the 3D image warping module 43 for filling holes of the buffer frame free of filling the left image and the right image. FIG. 5 further illustrates detail structure of depth image based rendering (DIBR) according to the present invention. Meanwhile, the present invention introduces the edge-dependent Gaussian filtering, which is capable of trade-off between external memory bandwidth and hardware cost, folding of Gaussian filtering PE for decreasing the hardware cost, pipe-lining of Gaussian filtering PE for increasing hardware speed, eliminating register number used as color buffer in general rendering hardware by stereo characteristic, reducing register number by local/global disparity separation, and replacing registers in 3D image warping with sing-port SRAM.

Figure 6:
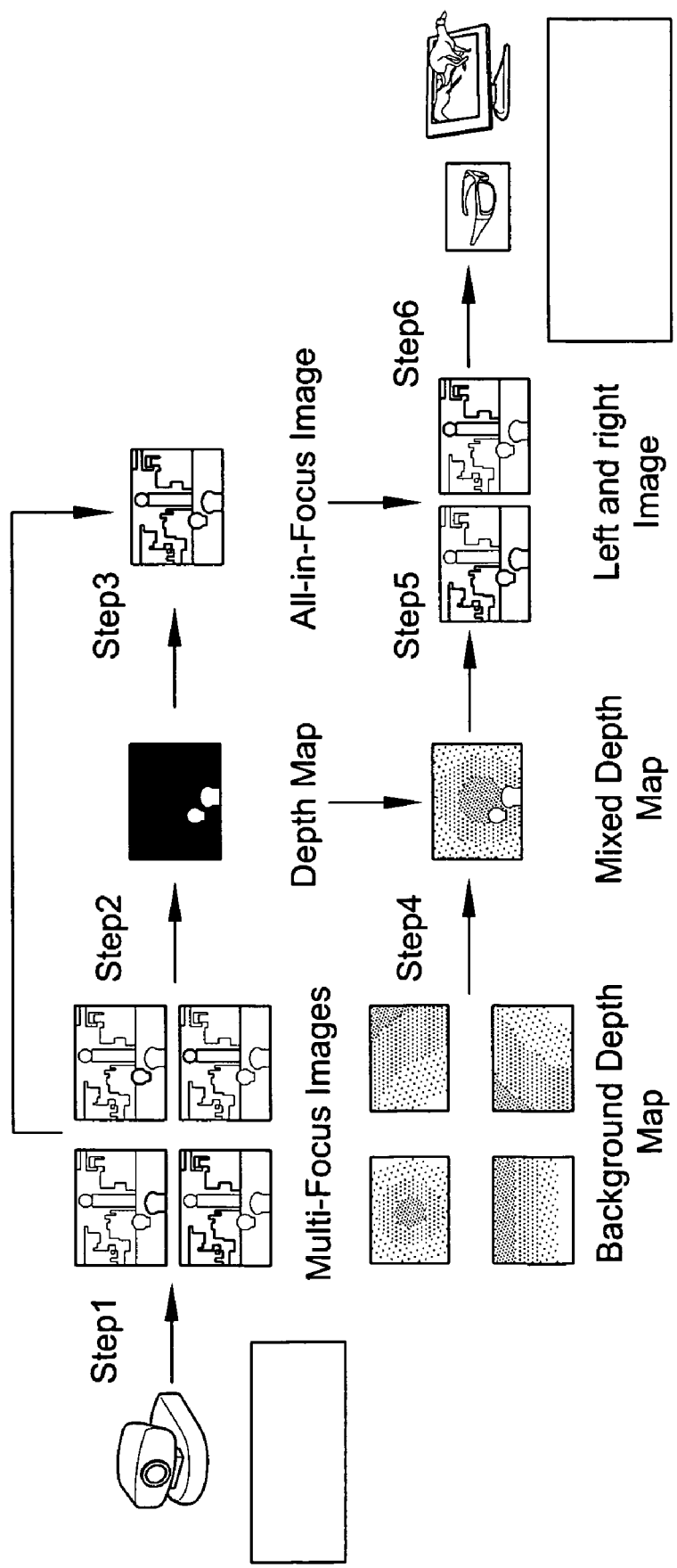
FIG. 6 illustrates the stereo 3D image capturing method according to the present invention.

In accordance with the aspect of the above system, the present invention further provides the stereo 3D image capturing method of a single lens auto focus camera. Please refer to FIG. 6. It illustrates the stereo 3D image capturing method according to the present invention. The method includes the steps of a) taking plural multi-focus images, as shown in step 1 of FIG. 6; b) estimating the plural multi-focus images to obtain a depth map (as shown in step 2 of FIG. 6) and an all-in-focus image (as shown in step 3 of FIG. 6); c) mixing the depth map with plural background depth maps to obtain a mixed depth map, as shown in step 4 of FIG. 6; d) obtaining respectively a left image for left eye of user and a right image for right eye of user by means of depth image based rendering (DIBR), as shown in step 5 of FIG. 6; and e) outputting the left image and the right image onto a 3D display, as shown in step 6 of FIG. 6. Meanwhile, the step d) and the step e) are executed via a field-programmable gate array (FPGA) and a processor. Furthermore, the step d) and the step e) can also be executed via an application-specific integrated circuit (ASIC) accelerator and a processor. The 3D display can be selected from a group consisting of Anaglyph Glasses, LCD-Shutter Glasses, LCD with Micro-retarder, two-view auto-stereoscopic 3D-LCD, 9-views 3D-LCD, and Polarized DLP Projector.

In practice, the plural multi-focus images are taken at several different focal lengths in a specific period. As the above descriptions, each pixel of the plural multi-focus images has a depth value obtained by means of a focus measure and depth estimation. The focus measure is executed via equation:

$$ML(x, y) = |2I(x, y) - I(x - \text{step}, y) - I(x + \text{step}, y)| +$$
$$|2I(x, y) - I(x, y - \text{step}) - I(x, y + \text{step})|$$
$$F(i, j) = \sum_{x=i-N}^{i+N} \sum_{y=i-N}^{i+N} ML(x, y) \text{ for } ML(x, y) \geq T_1$$

ML is a modified-Laplacian function, F is summation of ML, and I is a gray-level intensity of the pixel. Furthermore, the depth estimation is executed via equation:

$$\bar{d} = \frac{(\ln F_m - \ln F_{m+1})(d_m^2 - d_{m-1}^2) - (\ln F_m - \ln F_{m-1})(d_m^2 - d_{m+1}^2)}{2\Delta d\{(\ln F_m - \ln F_{m-1}) + (\ln F_m - \ln F_{m+1})\}}$$

Figure 7:
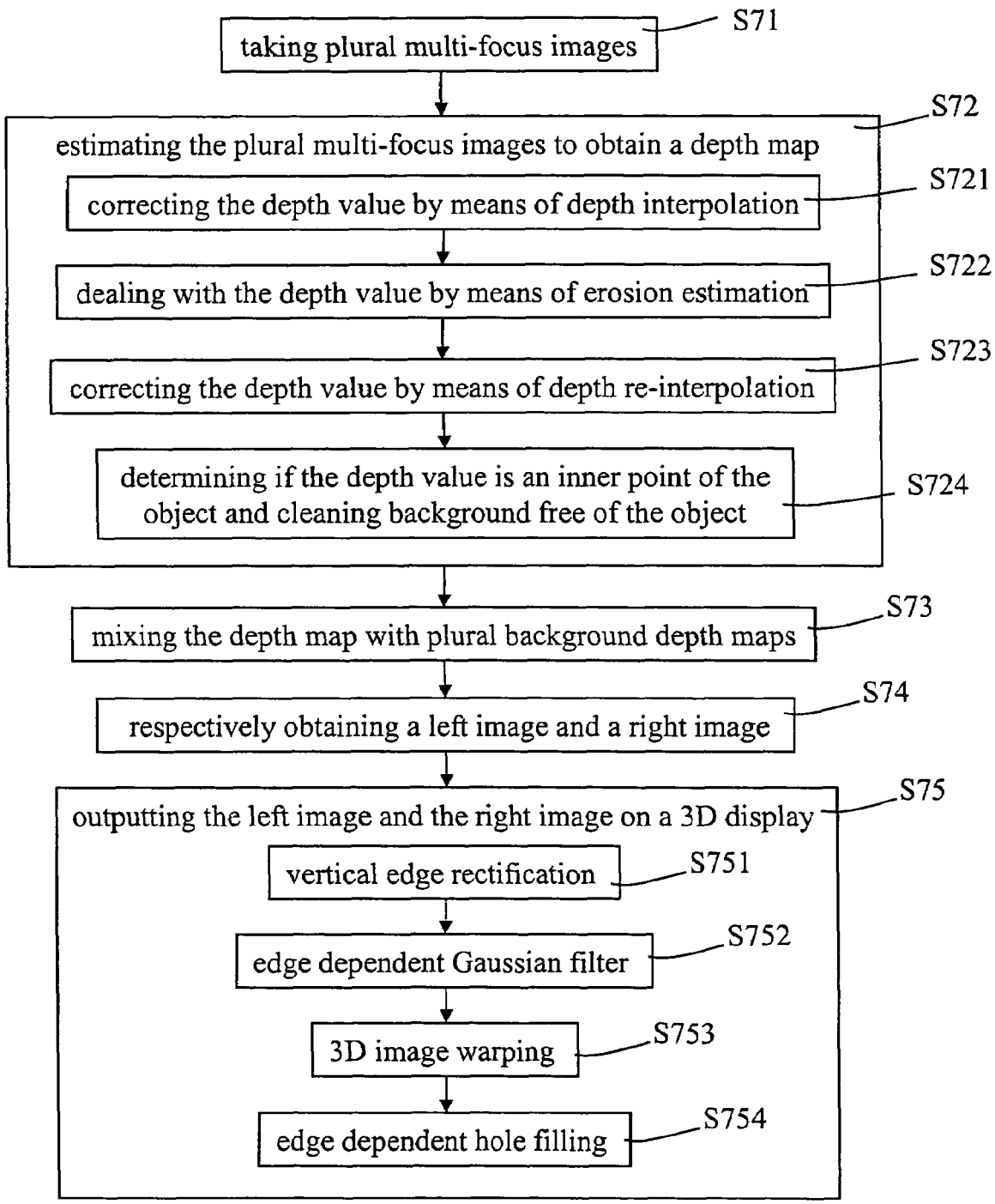
FIG. 7 illustrates detail flowchart of the stereo 3D image capturing method according to the present invention.

Certainly, the depth value can be a step function. FIG. 7 further illustrates detail flowchart of the stereo 3D image capturing method according to the present invention. Meanwhile, method includes the steps of a) taking plural multi-focus images, as shown in procedure S71 of FIG. 7; b) estimating the plural multi-focus images to obtain a depth map and an all-in-focus image, as shown in procedure S72, and the step b) further includes the steps of b1) correcting the depth value by means of depth interpolation, as shown in procedure S721; b2) dealing with the depth value by means of erosion estimation for defining an edge of object in the stereo 3D image, as shown in procedure S722; b3) correcting the depth value by means of depth re-interpolation, as shown in procedure S723; b4) determining if the depth value is an inner point of the object and clean background free of the object, as shown in procedure S724; c) mixing the depth map with plural background depth maps to obtain a mixed depth map, as shown in procedure S73; d) obtaining respectively a left image for left eye of user and a right image for right eye of user by means of depth image based rendering (DIBR), as shown in procedure S74; and e) outputting the left image and the right image onto a 3D display, as shown in procedure S75, and the step e) further includes the steps of e1) vertical edge rectification to prevent twisted and forked lines of combining the left image and the right image, as shown in procedure S751; e2) edge dependent Gaussian filtering to prevent hole formation in an edge of object, as shown in procedure S752; e3) 3D image warping to transform the left image and the right image to fill a buffer frame, as shown in procedure S753; and e4) edge dependent hole filling to fill holes of the buffer frame free of filling the left image and the right image, as shown in procedure S754. Accordingly, the system and the method of the present invention introduce depth estimation from multi-focus images for obtaining the stereo 3D image simply and efficiently.

In conclusion, the present invention provide a system and method for obtaining the stereo 3D video through a single lens camera and a stereo image synthesis, which introduces depth estimation from multi-focus images and depth image based rendering (DIBR) for obtaining the stereo 3D video, simplifies the entire structure and process, is capable of achieving the purpose of automatically obtaining the stereo 3D video, thereby facilitating user to take stereo image, and can rectify those drawbacks of the prior art and solve the above problems. Meanwhile the prior art fail to disclose that. Accordingly, the present invention possesses many outstanding characteristics, effectively improves upon the drawbacks associated with the prior art in practice and application, produces practical and reliable products, bears novelty, and adds to economical utility value. Therefore, the present invention exhibits a great industrial value.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A stereo three-dimensional (3D) image capturing method of a single lens auto focus camera, comprising the steps of:
    a) taking plural multi-focus images;
    b) estimating said plural multi-focus images to obtain a depth map and an all-in-focus image;
    c) mixing said depth map with plural background depth maps to obtain a mixed depth map;
    d) obtaining respectively a left image for left eye of user and a right image for right eye of user by means of depth image based rendering (DIBR); and
    e) outputting said left image and said right image onto a 3D display.

2. The stereo 3D image capturing method according to claim 1, wherein said plural multi-focus images are taken at several different focal lengths in a specific period.

3. The stereo 3D image capturing method according to claim 1, wherein each pixel of said plural multi-focus images has a depth value obtained by means of a focus measure and depth estimation.

4. The stereo 3D image capturing method according to claim 3, wherein said focus measure is executed via equation:

$$ML(x, y) = |2I(x, y) - I(x - \text{step}, y) - I(x + \text{step}, y)| +$$
$$|2I(x, y) - I(x, y - \text{step}) - I(x, y + \text{step})|$$
$$F(i, j) = \sum_{x=i-N}^{i+N} \sum_{y=i-N}^{i+N} ML(x, y) \text{ for } ML(x, y) \geq T_1$$

where ML is a modified-Laplacian function, F is summation of ML, and I is a gray-level intensity of said pixel.

5. The stereo 3D image capturing method according to claim 3, wherein said depth estimation is executed via equation:

$$\bar{d} = \frac{(\ln F_m - \ln F_{m+1})(d_m^2 - d_{m-1}^2) - (\ln F_m - \ln F_{m-1})(d_m^2 - d_{m+1}^2)}{2\Delta d\{(\ln F_m - \ln F_{m-1}) + (\ln F_m - \ln F_{m+1})\}}.$$

6. The stereo 3D image capturing method according to claim 3, wherein said depth value is a step function.

7. The stereo 3D image capturing method according to claim 3, wherein said step b) further comprises a step b1) of correcting said depth value by means of depth interpolation.

8. The stereo 3D image capturing method according to claim 7, wherein said step b) further comprises a step b2) of dealing with said depth value by means of erosion estimation for defining an edge of object in said stereo 3D image.

9. The stereo 3D image capturing method according to claim 8, wherein said step b) further comprises a step b3) of correcting said depth value, by means of depth re-interpolation.

10. The stereo 3D image capturing method according to claim 1, wherein said step e) further comprises the steps of:
   e1) vertical edge rectification to prevent twisted and forked lines of combining said left image and said right image;
   e2) edge dependent Gaussian filtering to prevent hole formation in an edge of object;
   e3) 3D image warping to transform said left image and said right image to fill a buffer frame; and
   e4) edge dependent hole filling to fill holes of said buffer frame free of filling said left image and said right image.

11. The stereo 3D image capturing method according to claim 1, wherein said step d) and said step e) are executed via a field-programmable gate array (FPGA) and a processor.

12. The stereo 3D image capturing method according to claim 1, wherein said step d) and said step e) are executed via an application-specific integrated circuit (ASIC) accelerator and a processor.

13. The stereo 3D image capturing method according to claim 1, wherein said 3D display is selected from a group consisting of Anaglyph Glasses, LCD-Shutter Glasses, LCD with Micro-retarder, two-view auto-stereoscopic 3D-LCD, 9-views 3D-LCD, and Polarized DLP Projector.

14. A stereo three-dimensional (3D) image capturing method of a single lens auto focus camera, comprising the steps of:
   a) taking plural multi-focus images, wherein each pixel of said plural multi-focus images has a depth value obtained by means of a focus measure and depth estimation;
   b) estimating said plural multi-focus images to obtain a depth map and an all-in-focus image;
   c) mixing said depth map with plural background depth maps to obtain a mixed depth map;
   d) obtaining respectively a left image for left eye of user and a right image for right eye of user by means of depth image based rendering (DIBR); and
   e) outputting said left image and said right image onto a 3D display;
   wherein said step b) further comprises steps of b1) correcting said depth value by means of depth interpolation; b2) dealing with said depth value by means of erosion estimation for defining an edge of object in said stereo 3D image; b3) correcting said depth value by means of depth re-interpolation; and b4) of determining if said depth value is an inner point of said object and clean background free of said object.

15. A single lens auto focus system for capturing a stereo 3D image, comprising:
   a capturing device with an auto focus module for taking plural multi-focus 2D images;
   a computation device connected with said capturing device for producing an all-in-focus image in response to said plural multi-focus images and obtaining a depth map of said stereo 3D image; and
   a 3D display device with depth image based rendering (DIBR) module connected with said computation device to receive said all-in-focus image and said depth map and then produce a left image for left eye of user and a right image for right eye of user, thereby displaying said stereo 3D image.

16. The single lens auto focus system according to claim 15, wherein each pixel of said plural multi-focus images has a depth value of a step function obtained by means of a focus measure and depth estimation via said computation device.

17. The single lens auto focus system according to claim 16, wherein said computation device obtains a focus measure via equation:

$$ML(x, y) = |2I(x, y) - I(x - \text{step}, y) - I(x + \text{step}, y)| +$$
$$|2I(x, y) - I(x, y - \text{step}) - I(x, y + \text{step})|$$
$$F(i, j) = \sum_{x=i-N}^{i+N} \sum_{y=i-N}^{i+N} ML(x, y) \text{ for } ML(x, y) \geq T_1$$

where ML is a modified-Laplacian function, F is summation of ML, and I is a gray-level intensity of said pixel.

18. The single lens auto focus system according to claim 17, wherein said computation device obtains depth estimation is executed via equation:

$$\bar{d} = \frac{(\ln F_m - \ln F_{m+1})(d_m^2 - d_{m-1}^2) - (\ln F_m - \ln F_{m-1})(d_m^2 - d_{m+1}^2)}{2\Delta d\{(\ln F_m - \ln F_{m-1}) + (\ln F_m - \ln F_{m+1})\}}.$$

19. The single lens auto focus system according to claim 15, wherein said 3D display device further comprises:
   a vertical edge rectification module for preventing twisted and forked lines of combining said left image and said right image;
   an edge dependent Gaussian filtering module connected with said vertical edge rectification module for preventing hole formation in an edge of object;
   a 3D image warping module connected with said edge dependent Gaussian filtering module for transforming said left image and said right image to fill a buffer frame; and an edge dependent hole filling module connected with said 3D image warping module for filling holes of said buffer frame free of filling said left image and said right image.

20. The single lens auto focus system according to claim 15, wherein said depth image based rendering (DIBR) module is a field-programmable gate array (FPGA) and a processor.

21. The single lens auto focus system according to claim 15, wherein said depth image based rendering (DIBR) module is an application-specific integrated circuit (ASIC) accelerator and a processor.

22. A single lens auto focus system for capturing a stereo 3D image, comprising:
   a capturing device with an auto focus module for taking plural multi-focus 2D images, wherein each pixel of said plural multi-focus images has a depth value of a step function obtained by means of a focus measure and depth estimation via said computation device;
   a computation device connected with said capturing device for producing an all-in-focus image in response to said plural multi-focus images and obtaining a depth map of said stereo 3D image;
   a 3D display device with depth image based rendering (DIBR) module connected with said computation device to receive said all-in-focus image and said depth map and then produce a left image for left eye of user and a right image for right eye of user, thereby displaying said stereo 3D image;
   a depth interpolation module for correcting said depth value;
   an erosion estimation module connected with said depth interpolation module for dealing with said depth value to define an edge of object in said stereo 3D image;
   a depth re-interpolation module connected with said erosion estimation module for correcting said depth value after erosion estimation; and
   a clean background module connected with said depth re-interpolation module for determining if said depth value is an inner point of said object and clean background free of said object;
   wherein said computation device obtains a focus measure via equations:

$$ML(x, y) = |2I(x, y) - I(x - \text{step}, y) - I(x + \text{step}, y)| +$$
$$|2I(x, y) - I(x, y - \text{step}) - I(x, y + \text{step})|$$

$$F(i, j) = \sum_{x=i-N}^{i+N} \sum_{y=i-N}^{i+N} ML(x, y) \text{ for } ML(x, y) \geq T_1$$

where ML is a modified-Laplacian function, F is summation of ML, and I is a gray-level intensity of said pixel,
wherein said computation device obtains depth estimation via equation:

$$\bar{d} = \frac{(\ln F_m - \ln F_{m+1})(d_m^2 - d_{m-1}^2) - (\ln F_m - \ln F_{m-1})(d_m^2 - d_{m+1}^2)}{2\Delta d\{(\ln F_m - \ln F_{m-1}) + (\ln F_m - \ln F_{m+1})\}}.$$

* * * * *

UNITED STATES PATENT AND TRADEMARK OFFICE
CERTIFICATE OF CORRECTION

| | | |
|---|---|---|
| PATENT NO. | : 7,616,885 B2 | Page 1 of 1 |
| APPLICATION NO. | : 11/541694 | |
| DATED | : November 10, 2009 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 500 days.

Signed and Sealed this

Nineteenth Day of October, 2010

David J. Kappos
*Director of the United States Patent and Trademark Office*